MAGNETIC TRANSDUCING HEAD

Original Filed Jan. 9, 1961 4 Sheets-Sheet 1

DONALD S. OLIVER
INVENTOR.
BY Stanley Belsky
ATTORNEY

March 15, 1966 D. S. OLIVER 3,240,881

MAGNETIC TRANSDUCING HEAD

Original Filed Jan. 9, 1961 4 Sheets-Sheet 2

DONALD S. OLIVER
INVENTOR.

BY Stanley Belsky
ATTORNEY.

March 15, 1966 D. S. OLIVER 3,240,881

MAGNETIC TRANSDUCING HEAD

Original Filed Jan. 9, 1961 4 Sheets-Sheet 3

DONALD S. OLIVER

INVENTOR.

BY Stanley Belsky

ATTORNEY.

DONALD S. OLIVER
INVENTOR.
BY Stanley Belsky
ATTORNEY

United States Patent Office 3,240,881
Patented Mar. 15, 1966

3,240,881
MAGNETIC TRANSDUCING HEAD
Donald S. Oliver, West Acton, Mass., assignor to Itek Corporation, Lexington, Mass., a corporation of Delaware
Continuation of application Ser. No. 81,326, Jan. 9, 1961. This application Mar. 11, 1965, Ser. No. 438,883
2 Claims. (Cl. 179—100.2)

This is a continuation of application Serial No. 81,326, filed January 9, 1961, now abandoned. This invention relates generally to data processing systems and more particularly to reading and erasing magnetic record data. The term "reading" as used herein included read-in, e.g., magnetic recording, and read-out, e.g., playback of magnetically recorded data.

Prior art systems for magnetic recording and playback utilize an electromagnetic transducer or "head" re-reciprocally to convert electric and magnetic signals. The head typically comprises an electromagnetic coupling means, such as an induction coil, coupled to a loop-shaped ferromagnetic core terminating in a pair of gap defining pole pieces. A magnetizable storage medium such as commonly known "magnetic tape" is placed in magnetic coupling proximity with the gap. Coupling between the head and tape takes place by intersecting the fringe magnetic field in the vicinity of the gap. The fringe field extends outside the gap defining pole pieces and intersects the plane defined by the opposite edges of the pole pieces at the outer periphery of the core.

The maximum information track width of the magnetic tape is defined by the width of the gap in proximity with the tape. To increase the gap width the head height is increased, as, e.g., by adding additional core laminations. For a fixed track width the height of prior art heads cannot be reduced below the width of the track. For many applications it is desirable to have a more compact and thinner head.

One common type of head consists of a plurality of flat rings formed from a low remanence ferromagnetic material. The rings are laminated together with their flat surfaces in face to face relationship to provide a permeable magnetic core. The core has a radial gap formed therein, and a coil is toroidally wound around a portion of it. An electric current passing through the coil produces magnetic flux in the core and consequently a magnetic flux across the length of the gap. A magnetic storage medium such as magnetic tape is brought into coupling proximity with the fringing flux in the vicinity of the gap in a plane perpendicular to the plane of the rings. For recording the fringing flux in this plane magnetizes the tape in proportion to the current in the coil. The width of of the magnetized track produced is determined by the width, i.e., the height of the head. The peripheral dimensions of the core in the plane of the ring are principally determined by the space needed to accommodate the toroidal winding previously mentioned.

For playback, magnetized signals of varying amplitude in the tape are coupled to the core through the pole piece edges and induce electrical signals in the winding. The transducer thus reciprocally converts magnetic and electrical signals.

In many applications it is desirable to reduce the size of the recording head while not sacrificing the recording track width. For example, in the copending application of Manfred R. Kuehnle, Serial No. 30,928, filed May 23, 1960, now abandoned, there is described and claimed a magnetic recorder using a magnetic tape which is in the form of an edge coiled helix. The Kuehnle application is assigned to the assignee of this application. The electromagnetic transducer is placed between adjacent helical turns of the helix and brought into contact with the magnetic surface of the tape. In order to obtain maximum data density in a given volume of tape, it is desirable that the adjacent helical turns of the tape be closely spaced. One limitation on the spacing of the turns is the volume of the head that must be inserted between the turns for recording, playback, or erasing. It is, therefore, desirable that the head occupy as small a volume as practicable. In addition, it is desirable that the head itself should be thin enough so that it may be inserted between the adjacent turns of the tape for random access to the data stored on individual loops of tape. Prior art heads, because of their size, do not lend themselves to this type of application. Such a head has a height at least, equal to the width of the recording track and a depth sufficient to accommodate the necessary toroidal windings. Therefore, with the prior art head one cannot obtain the thickness of head desirable for random access, nor the compactness of head for data storage density.

In known heads the functions of recording, reproduction and erasing have been accomplished by using heads of widely divergent designs. However, all known heads operate on the principle that the plane of the loop shaped ferromagnetic core, or in the case of certain erase heads the plane of the permanent magnet, is substantially perpendicular to the plane of the storage medium at the gap. Thus the useful fringe flux intersects a plane perpendicular to the core or magnet.

In the present invention the electromagnetic transducer includes a loop shaped ferromagnetic core. The core defines a surface patch and an axis normal to the surface patch. The term "surface patch" as used herein includes a generalized surface or part of a surface bounded by a closed curve in contradistinction to a surface of infinite extent. The term is used to cover various core configurations that are included within the scope of the invention. The loop shaped core provides a low reluctance closed loop flux path. Around one portion of the lamination a coil of wire is toroidally wound. The core terminates in a pair of gap-defining, spaced, juxtaposed pole pieces. The pole pieces are preferably formed out of the plane of the surface patch. It may be desirable to adjust the length of the gap by inserting therein a shim of non-magnetic material having a thickness equal to the desired gap length. The whole assembly may then be stiffened and potted using known techniques. In operation an electromagnetic transducer as just described is placed adjacent to a storage medium having a flat magnetic data storage surface whereby the line of contact between the magnetic storage surface and the gap is parallel to a plane tangent to the surface patch in the vicinity of the pole pieces. The fringe flux intersecting this parallel plane is operative on the storage media. Therefore, the combination of the head and the data storage medium is very compact.

It is therefore an object of the invention to provide an improved electromagnetic transducer exhibiting greater compactness for a given width of recording track.

It is another object of the invention to provide an improved electromagnetic transducer that is thinner than known electromagnetic transducers for a given information track width.

Still another object of the invention is to provide an improved magnetic data processing system exhibiting greater compactness and simplicity of structure.

Yet another object of the invention is to provide a magnetic reading head providing a range of information track widths without varying its thickness.

In accordance with the present invention there is provided a data processing article for reciprocally converting electrical and magnetic signals. The data processing article comprises a loop shaped ferromagnetic core means means defining a surface patch and axis normal to the patch. The core means defines a low reluctance closed loop flux path substantially coextensive with its loop shape. High reluctance means are coupled to the core means in series with the flux path. The pole pieces are so shaped as to provide at least one pair of opposed edges in a plane transverse to the axis and parallel to a plane tangential to the surface patch in the vicinity of the pole pieces. The pole pieces provide fringe flux lines intersecting the plane. In addition, electromagnetic coupling means are provided. The electromagentic coupling means are coupled to the core means, and in cooperation with the fringe flux reciprocally convert electrical and magnetic signals.

For a better understanding of the present invention, together with other and further objects thereof, reference is made to the following description taken in connection with the accompanying drawings and its scope will be pointed out in the appended claims.

In the drawings:

FIG. 10 is a sectional view taken along line 10—10 in FIG. 9; and

Figures 1, 2:
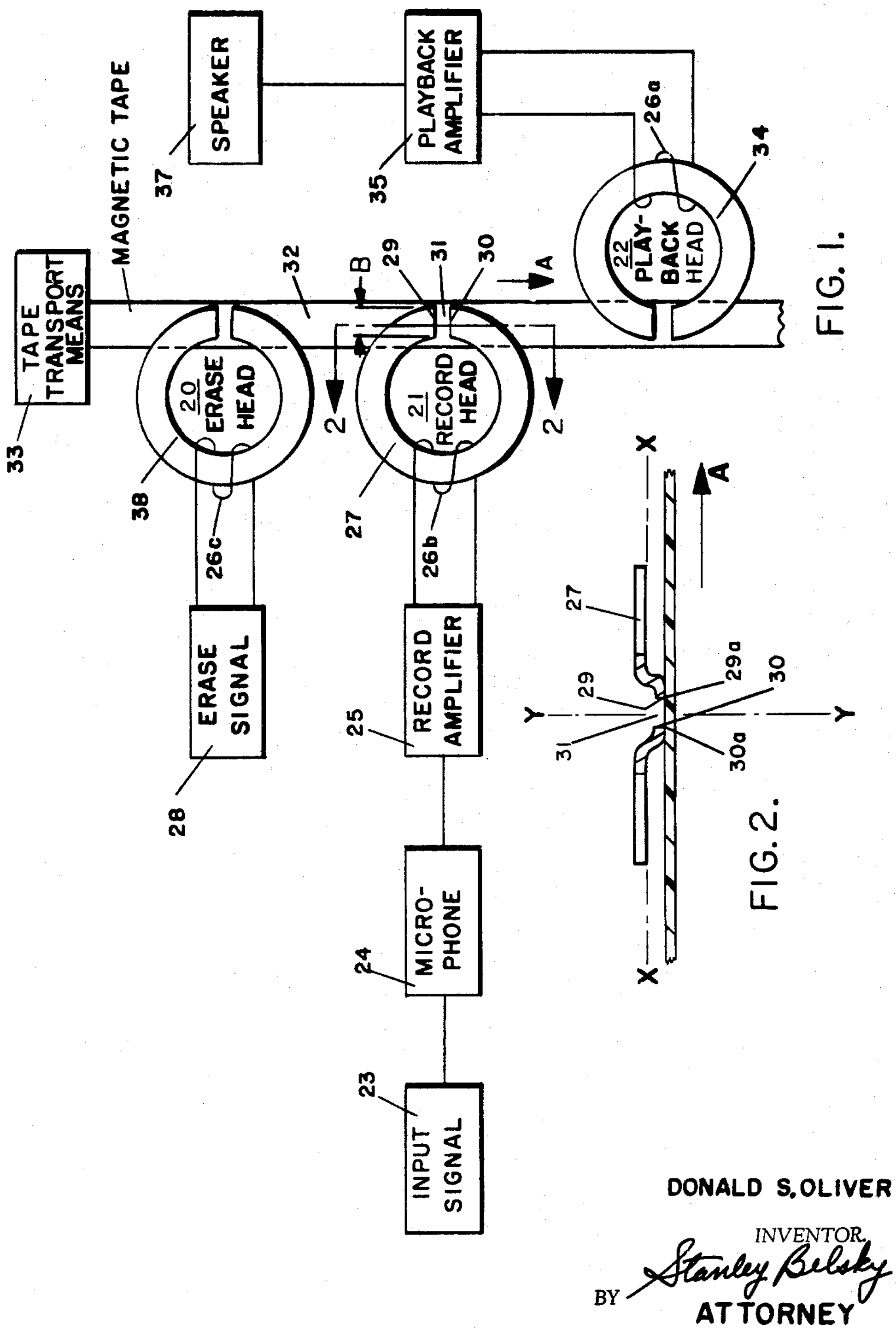
FIG. 1 is partially schematic diagram, of a data processing system, including an article embodying the present invention.
FIG. 2 is a sectional view taken along line 2—2 in FIG. 1.

Referring now to the drawings, and with particular reference to FIG. 1 there is here shown a partially schematic diagram illustrating a data processing system embodying the present invention. In FIG. 1 there is shown an erase head 20, record head 21, and playback head 22, made in accordance with the present invention. The record head and playback head are shown as two separate heads in this drawing for purposes of illustration only, it being understood by those skilled in the art that a single head may be used for either recording or playback.

The data processing system shown in FIG. 1 broadly illustrates a magnetic tape recorder system. For recording, an input signal is coupled through a microphone 24 and amplifier 25 to a record head 21. The head 21 is disposed in magnetic coupling proximity with a magnetizable data storage medium or tape 32, as shown. The head 21 includes an electromagnetic coupling means **26*b* and looped shaped ferromagnetic core 27 with a high reluctance gap 31 formed by pole pieces 29 and 30. An erase head 20 including an electromagnetic coupling means 26*c* and ferromagnetic core 38 is coupled to the tape 32**.

The outer perimeter of the loop shaped core defines a surface patch, the loop defining a low reluctance closed loop flux path. A bias flux may be produced in the core 27 by coupling the core to a D.C. power supply or other means well known in the recording art. The electromagnetic coupling means **26*b* produces a change in flux in the core 27 in accordance with the input signal 23. Juxtaposed pole pieces 29 and 30 define a high reluctance gap 31 in series with the flux path within core 27**. The high reluctance gap causes a fringe flux to appear at the gap. High reluctance material such as beryllium copper is preferably inserted in the core gap to insure a reliable gap length.

Referring now to FIG. 2, there is shown a cross-section of core 27 taken through the pole pieces 29 and 30 along line 2—2 in FIG. 1. As can be seen in FIG. 2, the pole pieces are so shaped that a pair of edges **29*a* and 30*a* lie in a plane transverse to an axis Y—Y which is normal to the surface patch defined by the core 27. In addition, the plane of edges 29*a* and 30*a*** is parallel to a plane tangential to the surface patch in the vicinity of the pole pieces, the trace of the tangential plane on the plane of the paper being indicated by the line X—X. The pole pieces thereby are terminal points for fringe flux lines that interesect the plane of the edges and are outside of the plane. In recording, the fringe flux varies with the input signal to the induction coil, and magnetizes magnetic storage medium in accordance therewith.

Referring once again to FIG. 1 and FIG. 2 a magnetic tape 32 is transported across the gap 31 by a tape transporting means 33. The tape transporting means 33 is adapted to pass the tape across the edges **29*a* and 30*a* of the pole pieces 29 and 30 in a plane parallel to X—X, at the gap 31, in a direction shown by the arrow A. As shown in FIG. 1, the maximum width of the recording track is the width of the gap 31** as indicated by the dimension "B."

The playback head 22 operates in the same manner as the recording head except that a portion of the remanant flux on the magnetic tape is diverted through the core. The motion of the tape in the vicinity of the palyback head core gap produces a varying flux in the core 34. The changing flux is converted via the coil **26*a* into an electric signal applied through a playback amplifier 35 to a speaker 37**, thus the heads may be used in accordance with the invention to read magnetic data.

To erase, an erase signal 28 is coupled to the core 38 of the erase head 20 through an induction coil **26*c***. The erase signal is selected, as well known in the art, to erase previously recorded magnetic data. For example the erase signal may be a D.C. signal sufficient to magnetically saturate the tape.

Figures 3, 3A:
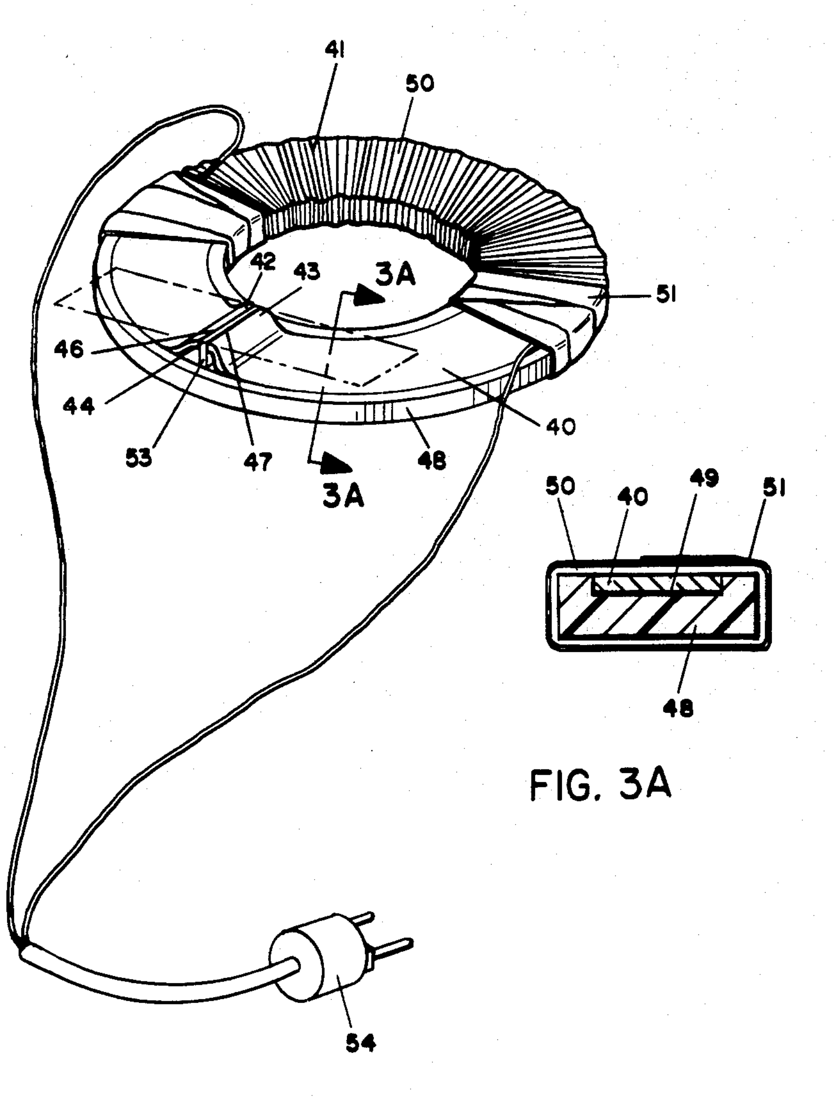
FIG. 3 is a perspective view of an electromagnetic transducer embodying the present invention.
FIG. 3A is a sectional view taken along lines 3A—3A in FIG. 3.

Referring now to FIG. 3 there is shown an electromagnetic transducer made in accordance with the preferred embodiment of the present invention. As heretofore stated, the electromagnetic transducer will be referred to as a head as it is commonly known in the art. The head may be used either as a recording head, playback head, or erase head. In particular, this head will be described in terms of a record-playback head. The head broadly includes ferromagnetic core means in the form of a loop-shaped core 40 and electromagnetic coupling means in the form of induction coil 41. As illustrated in FIGS. 1, and 2 the core 40 is loop shaped, defining a surface patch. Preferably the coil is formed as a substantially planar annulus as shown in FIG. 3. The core may be made of any of the known ferromagnetic materials. By way of example, it has been found that a core made of the material known in the trade as "HyMu 80" has been satisfactory. The ferromagnetic core 40 provides a low reluctance closed loop flux path coextensive with the annulus. High reflectance means in series with the core is provided in the form of juxtaposed pole pieces 42 and 43, defining a gap 44. The pole pieces are bent out of the plane of the core 40 so that the edges 46 and 47 lie in a plane that is parallel to the plane of the core and transverse to an axis normal to the plane of the core.

A non-magnetic shim 53, for example .0002-inch thick is placed in the gap 44 for controlling the gap length. The shim is preferably made of beryllium copper and held in place by a potting compound not shown. The core is supported on a support ring 48 which is preferably made from a nonconducting, nonmagnetic material as, for example, plastic. The support ring serves to prevent the core from becoming stressed unduly during the winding of the induction coil 41.

As shown in FIG. 3*a* a sectional view taken along the line 3A—3A in FIG. 3, the support ring has an annular recess 49. The support ring serves to prevent the core from becoming stressed unduly during the winding of the induction coil 41. In the preferred embodiment, a coil of wire 50 is placed around the corners of the support ring so that it contacts the core along the surface, thus minimizing stresses in the core due to winding. Such stresses may undesirably affect the magnetic characteristics of the core. The coil 50 is in turn covered by an insulating tape 51. The coil 50 may be connected to an external circuitry, not shown, by a connector 54. By way of example, it has been found that a core having a permeability of 25,000 to 30,000 and a coil of 800 turns of #40 copper wire, having an inductance of approximately 50 millihenries, are satisfactory for ordinary voice recording or playback.

The coil 50 is preferably symmetrically disposed about a central axis of symmetry in the plane of the core 40 passing through the gap 44 and connected in "humbucking" relation to reduce spurious signals generated by external magnetic fields. To further reduce effects of external magnetic fields, a magnetically permeable shield structure, not shown, may be used in the well-known manner.

The just described embodiment of the invention operates as follows: When recording on a storage medium, a time varying electrical signal to be recorded is applied to the terminals of the coil 50. This electrical signal is transformed into time varying magnetic flux in the core 40 proportional to the original electrical signal. A portion of the magnetic flux appears across the gap 44 as a fringe flux. If a magnetizable storage medium, as for example a magnetic tape shown in phantom in the figure, is passed at a constant rate past the gap 44, the fringe flux is coupled into the magnetic tape so as to magnetize it in a longitudinal direction. As a result the remanent field in the magnetic tape is proportional to the fringe flux which in turn is proportional to the input electrical signal.

When it is desired to reproduce or read out a signal stored in the storage medium, the head is used in the opposite way from the way just described. That is, a magnetic tape having a signal stored therein is moved past the gap 44 at a constant speed, causing a changing magneto-motive force across the gap 44 which in turn produces a varying flux in the core 40. This changing magnetic flux induces a corresponding electrical voltage in coil 50.

Figures 4, 5, 8:
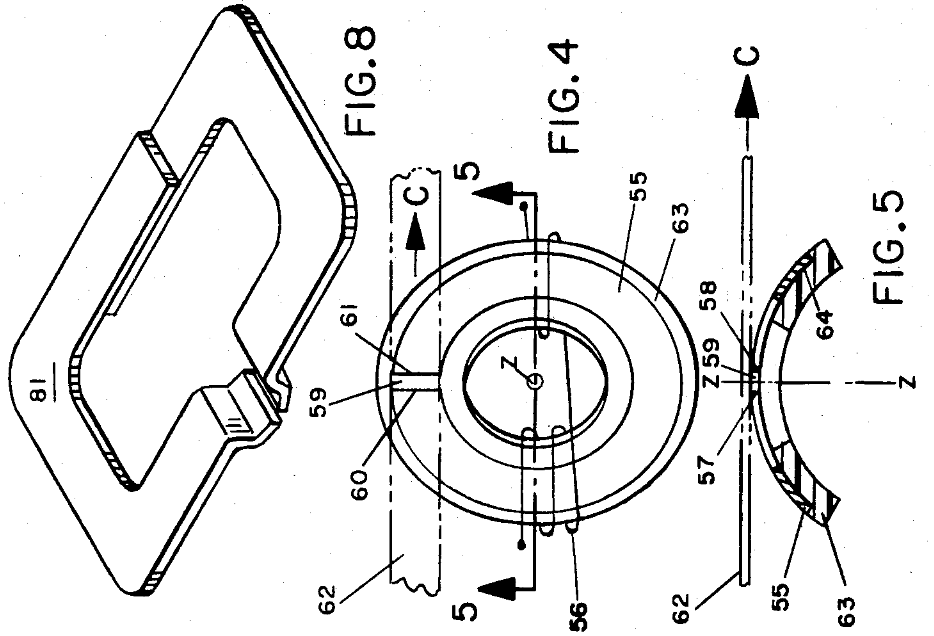
FIG. 4 is a plan view illustrating a modfication of the electromagnetic transducer in FIG. 3.
FIG. 5 is a sectional view of the embodiment illustrated in FIG. 4 taken along line 5—5 in FIG. 4.
FIG. 8 is a perspective view illustrating yet another modification of the electromagnetic transducer in FIG. 3.

Referring now to FIGS. 4 and 5 there is illustrated another embodiment of an electromagnetic transducer or head, made in accordance with the present invention. In FIGS. 4 and 5 there is shown a front elevation and top view, respectively, of an electromagnetic transducer which has the general configuration of an annulus arcuately bent about an axis parallel to a diameter of the annulus. At least two edges of the pole pieces are disposed so that the tape intersects the gap along a tangent to the head at the gap as will be more fully described hereinafter.

The electromagnetic transducer includes core means in the form of a loop shaped ferromagnetic core 55 and electromagnetic coupling means in the form of coil 56. The core 55 is formed as an annulus that is arcuately bent along a diameter, thereby defining a surface patch and a radial axis, normal to the surface patch. The core 55 provides a low reluctance closed loop flux path coextensive with the annulus. High reluctance means are provided in the form of juxtaposed pole pieces 57 and 58 defining a gap 59. The gap 59 is preferably perpendicular to the axis Z—Z and is along the diameter about which the core is arcuately bent. The edges 60 and 61 of the pole pieces 57 and 58 lie in a plane tangential to the core 55 at the gap 59 and transverse to the normal axis Z—Z. A magnetic tape 62 shown dotted intersects the pole pieces edges 60 and 61 in the tangential plane. Although the tape is shown as traveling in a direction parallel to the tangential plane by the arrows C, it will be apparent that tape need only be traveling parallel to the tangential plane at the gap 59.

The core is supported on a non-magnetic, non-conducting support ring 63 which has an annular recess 64 therein. An induction coil 56, shown schematically, is wound around the support ring and core for electromagnetically coupling an input signal to a magnetic tape 62. The coil is connected in "hum-bucking" relation as in FIG. 3, to reduce spurious signals generated by external magnetic fields. A magnetically permeable shield structure, not shown, may be used in the well known manner. A non-magnetic shim, not shown, may be placed in the gap 59 to control the gap length, similar to shim 53 in FIG. 3.

Figure 7:
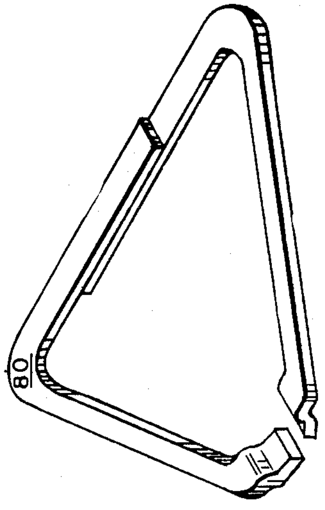
FIG. 7 is a perspective view illustrating still another modification of the electromagnetic transducer in FIG. 3.
Figure 6:
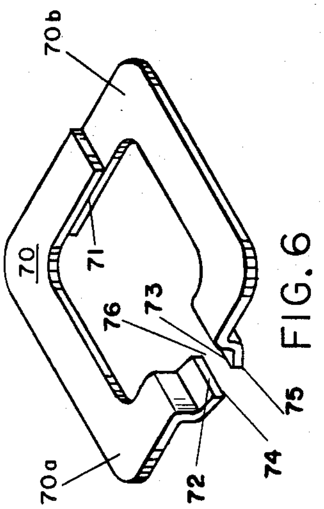
FIG. 6 is a perspective view illustrating another modification of the electromagnetic transducer in FIG. 3.

Referring now to FIGS. 6, 7 and 8 there are shown additional electromagnetic transducers embodying the present invention. Since the embodiments shown in FIGS. 6, 7 and 8 are generally similar to those shown and described in FIGS. 1–5, inclusive, similar parts such as support rings, coils, insulating tape, shims, etc. have been omitted to more clearly illustrate the invention. The construction of the omitted elements will be apparent to those skilled in the art from the previous descriptions and from what is known in the art.

Referring now to FIG. 6, there is shown a loop shaped ferromagnetic core means in the form of a substantially square shaped loop ferromagnetic core 70. The core defines a surface patch and a low reluctance closed loop flux path coextensive with the core. In this illustration, the core 70 is shown as being formed in two parts **70*a* and 70*b* for ease of fabrication. This type of construction allows layer type windings to be used. The two parts 70*a* and 70*b* are joined together by a lap joint 71. The joint is formed so as to be compatible with the low reluctance characteristics of the core. The pole pieces 72 and 73 define a gap 76, and are so shaped as to provide a high reluctance means in series with the core 70. A pair of edges 74 and 75**, which, in operation, contact the magnetic tape lie in a plane substantially parallel to a tangent to the surface patch in the vicinity of the gap. The electromagnetic transducer shown in FIG. 6 has the overall appearance of a thin, flat, planar loop for facilitating random access and to provide compactness as previously discussed.

Referring now to FIGS. 7 and 8 there are illustrated alternate forms of electromagnetic transducers embodying the present invention. In FIG. 7 the loop shaped core 80 is triangular in shape, while in FIG. 8 the loop shaped core 81 is rectangular in shape. The aforementioned cores are shown for the purpose of illustrating loop shapes embodying the invention. It will be apparent that many other loop shapes, not specifically illustrated, also embody the present invention.

Figure 9:
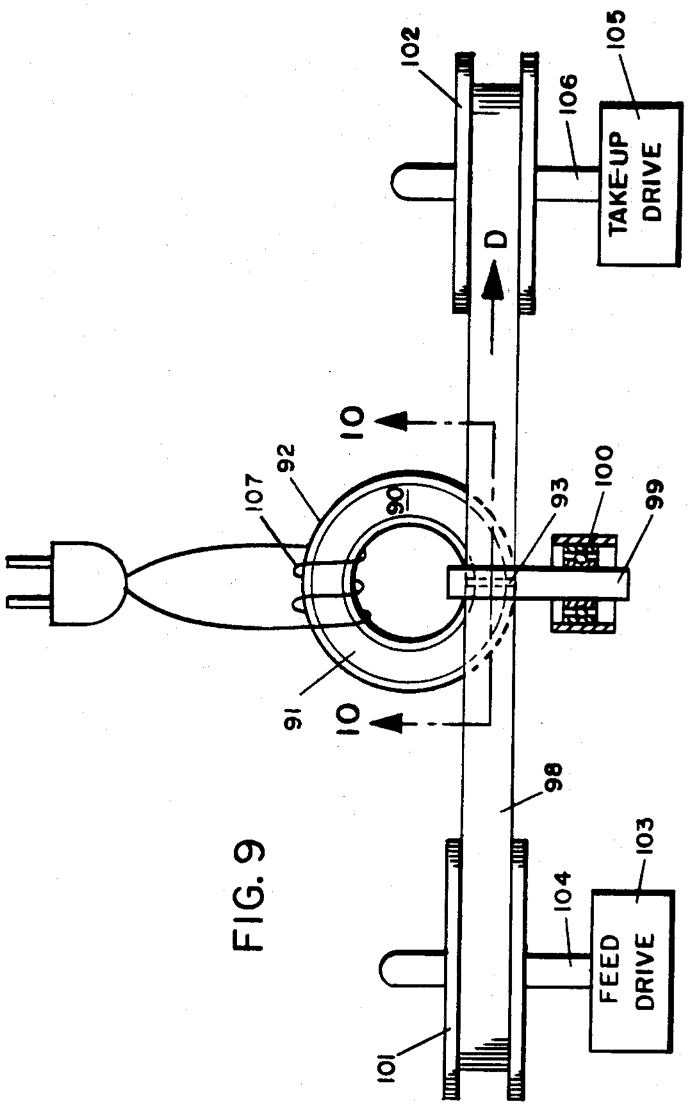
FIG. 9 is a front elevational view, partially schematic, of a data processing system embodying the present invention.
Figure 10A:
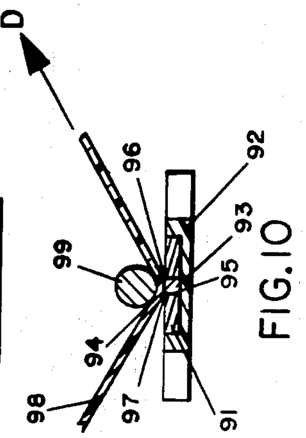
FIG. 10A is a sectional view illustrating a modification of the system illustrated in FIGS. 9 and 10.
Figure 10A:
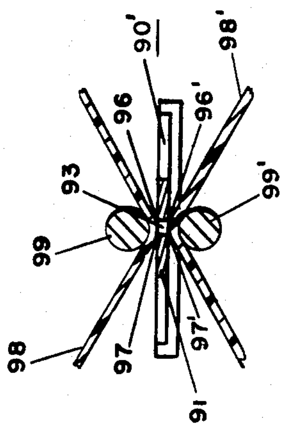

Referring now to FIGS. 9 and 10 there is here illustrated, a tape transport and electromagnetic transducer assembly embodying the present invention. FIG. 9 is a front elevational view of the assembly, while FIG. 10 is a section taken along line 10—10 in FIG. 9. In this embodiment, there is a thin flat planar electromagnetic transducer and a tape transport means adapted for transporting the tape across a gap in the transducer so that the tape intersects the gap along a line that is tangential to the plane of the transducer. The electromagnetic transducer 90 includes a thin flat planar core 91. The core is in the shape of an annulus and made of a ferromagnetic material to provide a low reluctance flux path coextensive with the core. The core 91 is mounted on a non-magnetic nonconducting annular supporting ring 92 having a recess therein for retaining the core. A substantially radial gap 93 is formed in the core by a pair of oppositely spaced juxtaposed pole pieces 94 and 95 for providing a high reluctance path in series with the low reluctance path through the core. The pole pieces are so shaped that at least one pair of edges 96 and 97 are adapted to intersect the magnetic tape 98 tangent to the plane of the core. A capstan 99 mounted in a bearing 100 guides the tape and maintains it in contact with the pole pieces edges 96 and 97. Although not shown, the capstan may be spring biased to provide a slight pressure on the tape thus insuring positive contact with the pole pieces edges. The tape is coupled to a transport means in the form of a feed reel 101 and takeup reel 102. A feed drive 103 is provided for driving a spindle 104 which is coupled to the feed reel 101. A takeup drive 105 drives a spindle 106 coupled to the takeup reel 102. If desired, a single drive may drive both the feed reel and the takeup reel, as well known in the art. In operation, tape moving in the direction shown by the arrow D is guided by the capstan 99 to intersect the gap 93 in a plane along a line tangent to the plane of the electromagnetic transducer 90. Fringe flux existing across the gap, as previously described, intersects the tape for providing magnetic orientation of the particles thereon to provide indicia of data. This head may also be used for playback as previously described with connection to FIGS. 1–3, inclusive. The electromagnetic coupling means 107, shown schematically in FIG. 9, are provided for electromagnetically coupling an input signal to the magnetic tape through the flux path and to convert magnetic indicia on the tape to electrical signals.

In FIG. 10A there is shown another embodiment of the invention described in FIGS. 9 and 10 whereby a single electromagnetic transducer may be used simultaneously to record two magnetic tapes with identical signals, or to playback from two tapes through a single head. Since the embodiment shown in FIG. 10A is similar to that shown in FIGS. 9 and 10, like numerals will be used for like components, and similar components indicated by a prime after the numeral. In FIG. 10A two tapes are symmetrically disposed about the plane of the electromagnetic transducer. Two transport assemblies, not shown, but each being similar to the one shown and described in FIGS. 9 and 10 are provided. For convenience of explanation the only portions of the new transport assemblies shown in FIG. 10A are the capstans 99 and 99'. The capstans are disposed on opposite sides of the plane of the electromagnetic transducer 90'. The electromagnetic transducer 90' is similar to the one shown in FIG. 9 except that the support ring is removed along a sector of the annulus for at least the length of the gap 93. With this type of construction the gap 93 is exposed along both sides of the core 91, whereby two pairs of edges 96–97, and 96'–97' are left exposed to intersect with tapes 98 and 98' respectively. Each tape intersects a pair of edges tangential to the plane of the core at the gap. Since the fringe flux intersecting a plane tangential to the core at the gap is identical along either planar surface of the core 91, the tapes 98 and 98' will contain identical lines of magnetic flux thus providing identical recording on tapes 98 and 98', or simultaneous playback from tapes 98 and 98'. It will also be apparent that this head may also be used for erasing two tapes simultaneously by applying an erasing signal through the coil.

It will be apparent that the embodiment shown in FIGS. 9, 10, and 10A leads to a more compact tape and head assembly than previously known in the art. Although the head has been described in terms of an annulus it will also be apparent that other planar shapes such as a C shape, for example, are also suitable for use in this embodiment. In addition, although the tape has been shown as being spirally wound on spools as well known in the art, it is contemplated that other tape transport systems may be used without departing from he concept of the present invention, it being only necessary that the tape intersect the gap along a plane that is tangenial to the plane of the core at the gap. It will also be apparent that the electromagnetic transducers shown in FIGS. 3 through 8 may be used in place of the electromagnetic transducer 90 shown in FIGS. 9 and 10 without departing from the concept of the present invention.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A data processing system, comprising:

an electromagnetic transducer including a substantially thin, ferromagnetic core, said core having inner and outer edges defining concentric loops, and the major portion of said core defining a plane having a normal axis within said inner edge, gap defining means coupled to said core, intersecting both said loop defining edges and having juxtaposed pole pieces shaped so as to provide two symmetrically disposed pairs of opposed pole piece edges coextensive with said core plane and an electromagnetic coupling means coupled to said core for converting electrical and magnetic signals;

first transport means for transporting a magnetic data storage medium across one pair of pole piece edges;

second transport means for simultaneously transporting a magnetic data storage medium across said second pair of pole piece edges, whereby said media are simultaneously in operative engagement with said electromagnetic transducer.

2. The combination of claim 1 wherein said core consists of a single lamina.

References Cited by the Examiner

UNITED STATES PATENTS

| | | | |
|---|---|---|---|
| 2,423,339 | 7/1947 | Newman | 179—100.2 |
| 2,655,563 | 10/1953 | Connell | 179—100.2 |
| 2,868,889 | 1/1959 | Patterson | 179—100.2 |
| 3,124,803 | 3/1964 | Howman | 346—74 |

IRVING L. SRAGOW, *Primary Examiner.*